(12) United States Patent
Martin-Meyer et al.

(10) Patent No.: US 11,300,156 B2
(45) Date of Patent: Apr. 12, 2022

(54) RAM-BODY FRETTING CORROSION PROOF SOLUTION

(71) Applicant: GOODRICH ACTUATION SYSTEMS SAS, Saint Ouen l'Aumône (FR)

(72) Inventors: Johann Martin-Meyer, Maisons-Laffitte (FR); Emmanuel Lecomte, Beauchamp (FR)

(73) Assignee: GOODRICH ACTUATION SYSTEMS SAS, Saint Ouen l'Aumône (FR)

( * ) Notice: Subject to any disclaimer, the term of this patent is extended or adjusted under 35 U.S.C. 154(b) by 0 days.

(21) Appl. No.: 16/709,978

(22) Filed: Dec. 11, 2019

(65) Prior Publication Data

US 2021/0018042 A1   Jan. 21, 2021

(30) Foreign Application Priority Data

Jul. 19, 2019   (EP) ...................................... 19290059

(51) Int. Cl.
| | | |
|---|---|---|
| *F16C 33/06* | (2006.01) | |
| *F16C 17/10* | (2006.01) | |
| *F16C 23/04* | (2006.01) | |
| *B64D 41/00* | (2006.01) | |

(52) U.S. Cl.
CPC ............ *F16C 33/06* (2013.01); *F16C 17/105* (2013.01); *F16C 23/043* (2013.01); *B64D 41/007* (2013.01); *F16C 2220/66* (2013.01)

(58) Field of Classification Search
CPC ... F16C 11/06; F16C 11/0614; F16C 11/0685; F16C 17/105; F16C 33/06; F16C 35/02; F16C 23/04; F16C 23/043; F16C 2220/66; B21D 53/10; B64D 41/007
See application file for complete search history.

(56) References Cited

U.S. PATENT DOCUMENTS

| | | | | |
|---|---|---|---|---|
| 4,109,979 | A | | 8/1978 | Estaque |
| 4,337,559 | A | | 7/1982 | Rangel |
| 5,052,824 | A | * | 10/1991 | Van Wyk ............... F16C 23/045 384/203 |
| 5,507,580 | A | * | 4/1996 | Dezzani .................. C21D 9/40 384/492 |
| 2002/0168122 | A1 | | 11/2002 | Kletzli et al. |
| 2007/0102927 | A1 | | 5/2007 | Dubedout et al. |
| 2009/0080818 | A1 | | 3/2009 | Sasaki et al. |
| 2015/0251512 | A1 | | 9/2015 | Karpman et al. |
| 2017/0356496 | A1 | * | 12/2017 | Bekircan ............. F16C 11/0614 |

FOREIGN PATENT DOCUMENTS

EP   3232074 A1   10/2017

OTHER PUBLICATIONS

European Search Report for Application No. 19290059.5, dated Feb. 13, 2020, 7 pages.

* cited by examiner

*Primary Examiner* — Alan B Waits
(74) *Attorney, Agent, or Firm* — Cantor Colburn LLP

(57) ABSTRACT

A ram-body for use with a spherical bearing has an inner circumferential surface. The ram-body comprises at least a first concave section provided in said inner circumferential surface. In some examples, a second concave section may be provided diametrically opposite to the first concave section. In some examples, the concave sections may be lunular shaped. A method of manufacturing the ram-body is also described. A ram-body and spherical bearing assembly is also described.

11 Claims, 6 Drawing Sheets

RAM-BODY FRETTING CORROSION PROOF SOLUTION

FOREIGN PRIORITY

This application claims priority to European Patent Application No. 19290059.5 filed Jul. 19, 2019, the entire contents of which is incorporated herein by reference.

TECHNICAL FIELD

The present disclosure relates to a spherical bearing for use in combination with a ram-body as well as to solutions for preventing fretting corrosion of a ram-body and spherical bearing.

BACKGROUND

The European Union REACH regulations are aimed at improving the protection of human health and the environment from the risks posed by chemicals, whilst also enhancing the competitiveness of the EU chemicals industry. Due to these regulations, ram bodies that are used in primary flight controls are required to have a lower level of Cadmium than before and so until now the regulations have been met by using steels with these lower Cadmium levels. The design standard for known ram-bodies of this kind use 15-5PH CRES without any type of surface treatment. The ram-body further has a spherical bearing crimped into it and this bearing is also made of CRES (for example, 17-4PH may be used for the spherical bearing).

Due to the fact that there is a stiff contact between these two CRES parts, it has been found that fretting corrosion occurs at the points at which these surfaces are in contact with each other. This in turn results in fatigue. The examples described herein provide solutions for preventing such corrosion.

SUMMARY

According to a first aspect, the disclosure provides a ram-body for use with a spherical bearing, said ram-body having an inner circumferential surface; wherein said ram-body comprises at least a first concave section provided in said inner circumferential surface.

In any of the examples described herein, the first concave section may be lunular shaped.

In any of the examples described herein, first and second intersect points between the ram-body and the concave section may be defined by an arc angle of from 40° to 50° from a center of the ram-body. The first and second intersect points define first and second edges of the concave section.

In any of the examples described herein, the arc angle may be 40°.

In any of the examples described herein, said concave section may be defined by a first concave circular arc.

In any of the examples described herein, a center point of said concave circular arc may be positioned between a center point of the ram-body and the inner circumferential surface of the ram-body.

In any of the examples described herein, a ratio of the length of the intersection radius to the length of the internal radius of the ram-body may be in the range of 1:2 to 1:2.6.

In some examples. The ratio is approximately 1:2.55.

In any of the examples described herein, the ram-body may further comprise a second concave section, identical to said first concave section.

In any of the examples described herein, the first and second concave sections may be positioned so as to be diametrically opposite each other.

A ram-body and spherical bearing assembly is also described herein, comprising any of the ram-body examples described herein. The assembly further comprises a spherical bearing having an outer surface, wherein said ram-body may be provided around said spherical bearing so that said inner circumferential surface of said ram-body is in contact with said outer surface of said spherical bearing. The inner circumferential surface of said ram-body at this first concave section is not in contact with said outer surface of said spherical bearing.

A similar ram-body and spherical bearing assembly is also described herein, which has two of these concave sections. This assembly may comprise a spherical bearing having an outer surface, said ram-body may be provided around said spherical bearing so that said inner circumferential surface of said ram-body is in contact with said outer surface of said spherical bearing. As for the first concave section, the inner circumferential surface of said ram-body at said second concave section is not in contact with said outer surface of said spherical bearing.

A method of manufacturing any of the ram bodies described herein, for use with a spherical bearing, is also described herein. The method comprises forming at least a first concave section in said inner circumferential surface of the ram-body.

The method may further comprise forming a second concave section on said inner circumferential surface. The method may further comprise positioning said second concave section so as to be diametrically opposite to said first concave section.

In any of the examples described herein, the ram-body and/or the spherical bearing may be made from stainless steel. The first and/or second concave sections may be formed by milling.

In some examples, the method may comprise forming the first concave section and/or the second concave sections so that they are lunular shaped.

BRIEF DESCRIPTION OF THE FIGURES

Certain embodiments of the present disclosure will now be described in greater detail by way of example only and with reference to the accompanying drawings in which.

DETAILED DESCRIPTION

Figure 1:
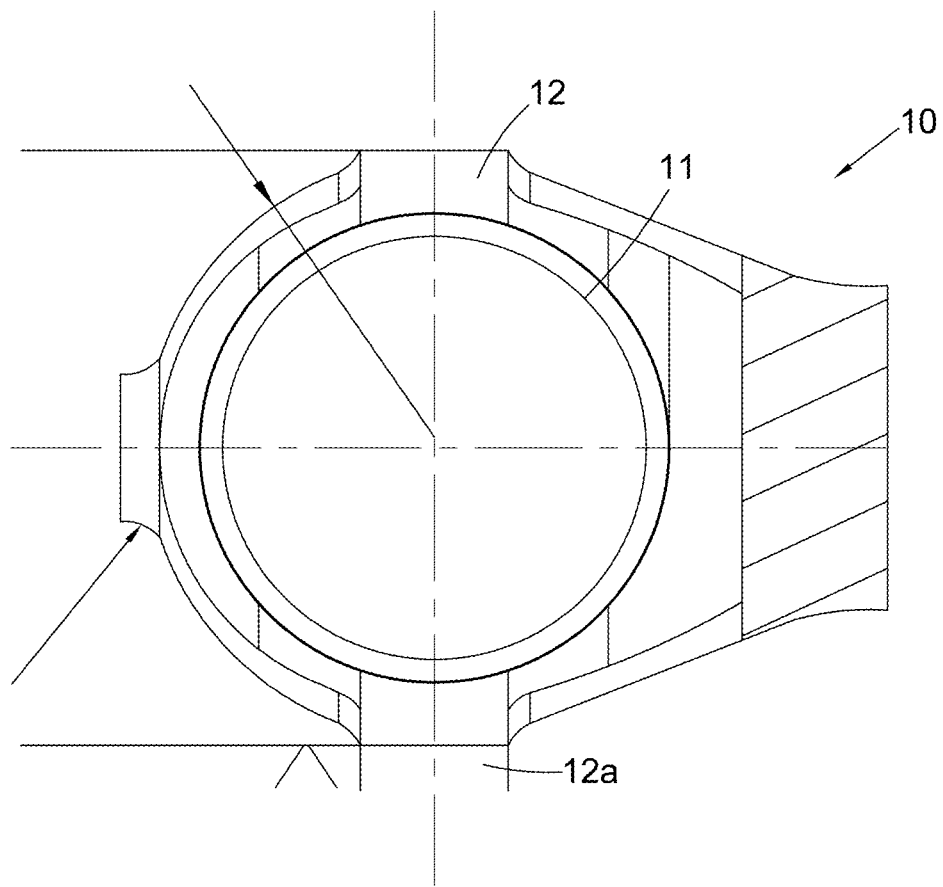
FIG. 1 shows a known ram-body for use with a spherical bearing.

FIG. 1 shows a known CRES ram-body 10 that may have a spherical bearing (not shown) positioned inside it. As can be seen in FIG. 1, the internal surface 11 of the known ram-body 10 is completely circular and has a uniform inner circumference. As described above, due to the fact that there is a stiff contact between these two CRES parts (i.e. the ram-body 10 with the spherical bearing positioned inside), it has been found that fretting corrosion occurs at the points at which these surfaces are in contact with each other. This in turn results in fatigue. In some known assemblies, an interface product may be provided between these parts to help reduce this fretting corrosion. Such interface products may comprise a silver plating. The examples described herein aim to provide an alternative and improved solution to prevent this fretting corrosion.

Figure 2:
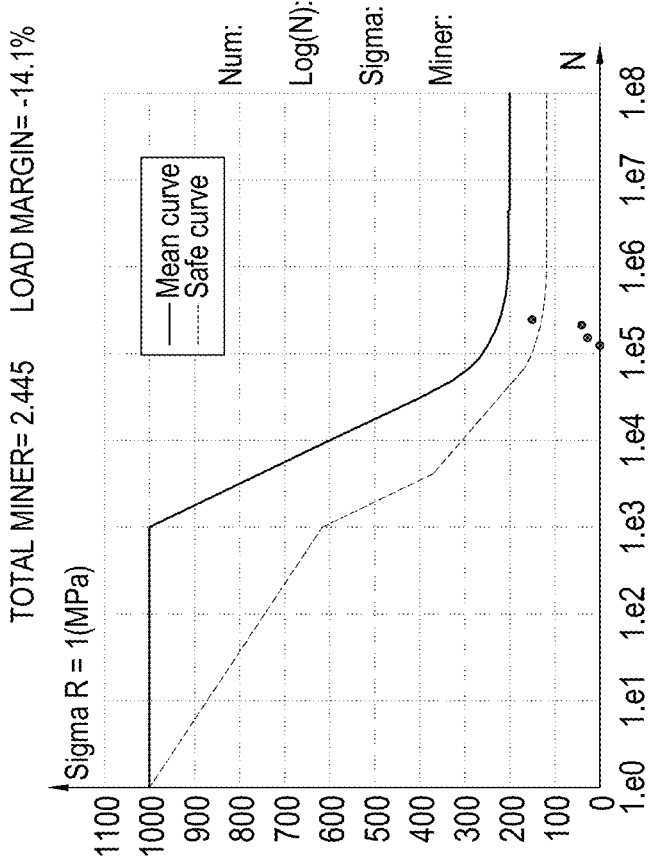
FIG. 2 shows a Finite Element Analysis (FEA) of a known ram-body for use with a spherical bearing.

FIG. 2 depicts a Finite Element Analysis (FEA) of the known design of FIG. 1. A spherical bearing is not shown inside the ram-body but has been simulated by boundary conditions. It can be seen from this figure that there is a maximum constraint of 434 Mpa under the fatigue spectrum. In FIGS. 1 and 2 the point of maximum stress on the inner circumference of the ram-body 10 is depicted with reference numbers 12 and 12a.

Figure 3:
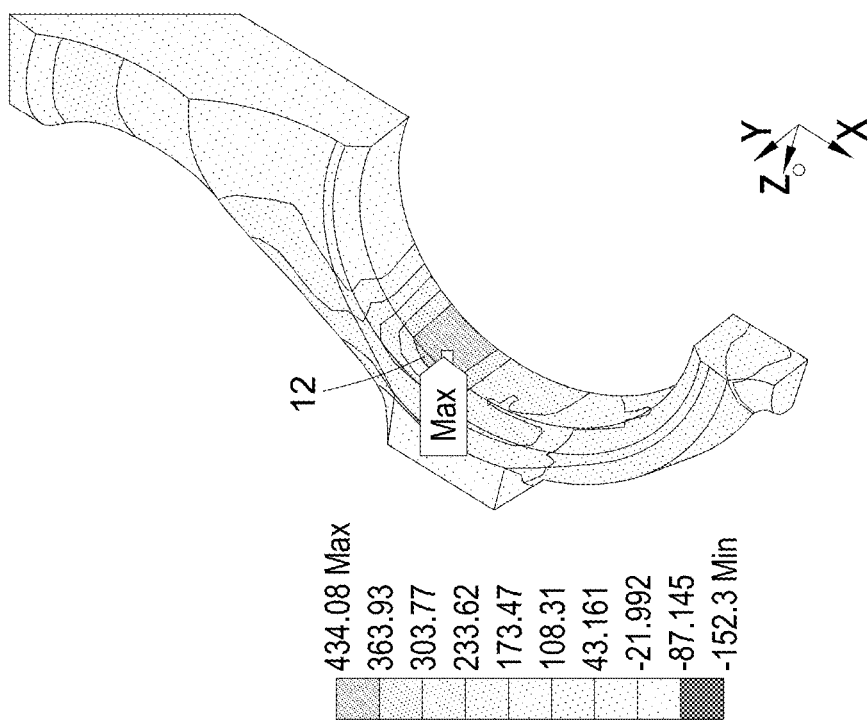
FIG. 3 depicts a fatigue analysis of the bearing and ram-body assembly comprising the ram-body as shown in FIG. 2.

FIG. 3 depicts fatigue analysis results of a bearing and ram-body assembly comprising a known ram-body such as that shown in FIG. 2 in combination with a known spherical bearing (not shown). As can be seen from this figure, once the fretting corrosion factor is applied on a Wohler curve, we can observe a negative margin of −14.1%.

A new type of ram-body and spherical bearing assembly will now be described with reference to FIGS. 4 to 8. The examples described herein may be used in primary flight controls, however, other uses are also envisaged.

Figure 4:
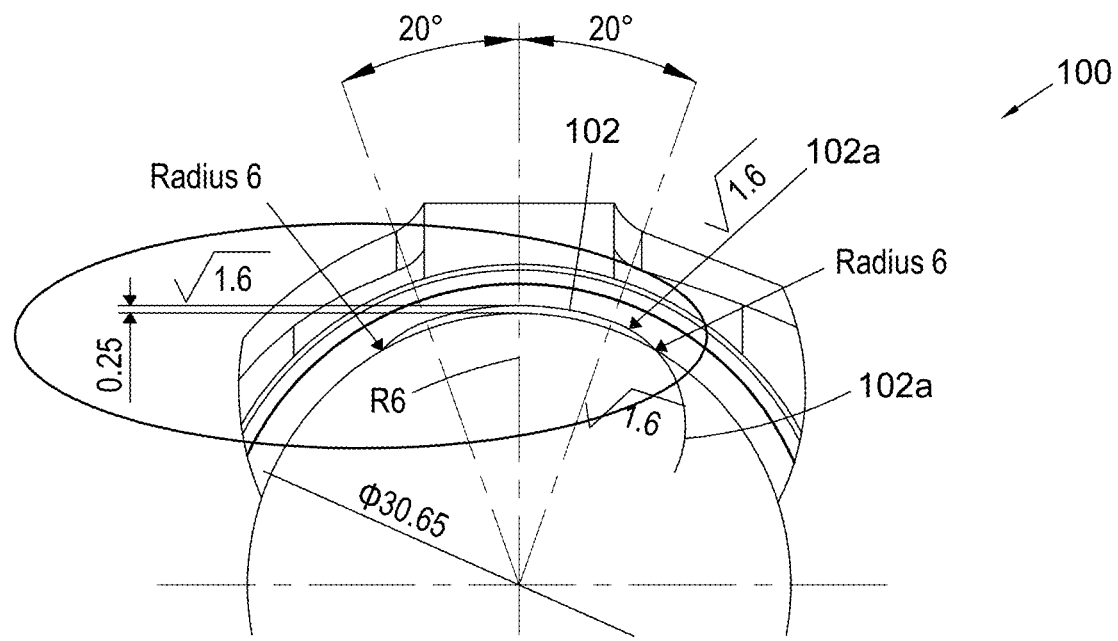
FIG. 4 shows an example of a modified ram-body for use with a spherical bearing as described herein.
Figure 7:
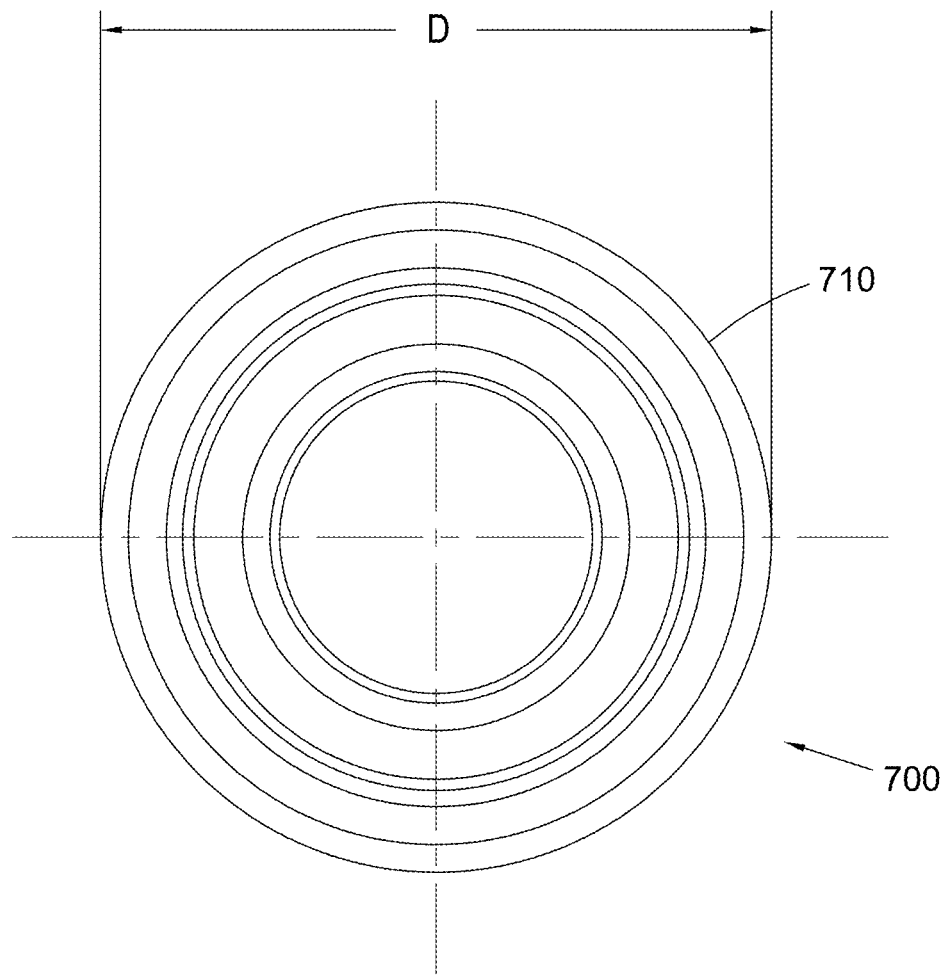
FIG. 7 depicts a spherical bearing that may be used with the modified ram-body as described with reference to FIGS. 4 to 6.

FIG. 4 depicts an example of a new type of ram-body 100 that may be used with a spherical bearing 700 (shown separately in FIG. 7). Both the ram-body 100 and the spherical bearing 700 may be made from stainless steel. The bearing 700 is shown in FIG. 7 and this is fitted so that it sits internally of the ram-body 100 so that the outer surface 710 of the spherical bearing 700 is in contact with the inner surface of the ram-body 100 in use. The outer diameter D of the spherical bearing 700 should be very close to the inner diameter of the ram-body 100 so that a friction connection occurs in use.

This new type of ram-body 100 comprises an inner circumferential surface 101, however, in contrast to known ram bodies 10 such as that shown in FIGS. 1 to 3, this new ram-body 100 comprises at least a first section 102 that is concave (relative to the curve of the internal circumferential surface 101 of the ram-body 100). In some examples, the ram-body 100 comprises also a second section 103 that is concave. These concave sections 102, 103 may be half-moon, or lunular shaped and in some examples may be the same shape and size and depth.

Figures 5, 6:
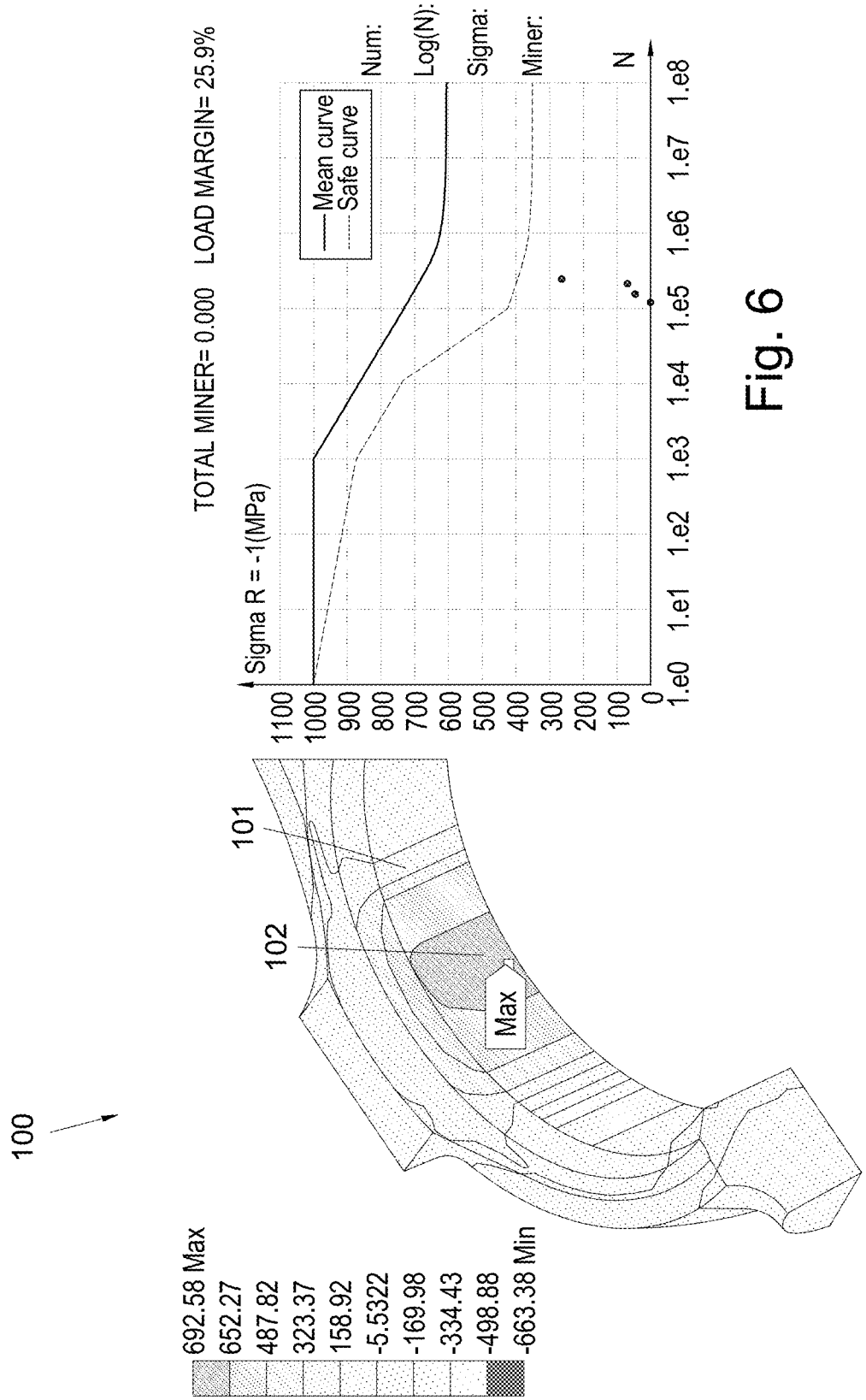
FIG. 5 shows a Finite Element Analysis (FEA) of the new type of ram-body and as shown in FIG. 4.
FIG. 6 shows a fatigue analysis of the new type of bearing and ram-body assembly comprising the ram-body as shown in FIG. 4.

This new type of ram-body having first and second concave sections have been found to greatly reduce the fretting corrosion that is normally found in such assemblies. For example, FIG. 5 shows a Finite Element Analysis (FEA) of the new design of a section of the ram-body 100 as shown in FIGS. 4 and 5. One of the lunular shaped sections can be seen at 102. In this example, due to the presence of this lunular shaped section(s) the constraint has increased, (in comparison to FIG. 2) to 692 Mpa, and the stress margin is now positive up to 25.9% with the help of the fretting corrosion knockdown factor suppression.

FIG. 6 depicts the Wohler curve and safety margin for the new type of ram-body and bearing design described herein, knowing the knockdown factor suppression. This provides a positive margin of 25.9%. This can be compared to FIG. 3, which shows the Wohler curve and safety margin for a conventional design, knowing the knockdown factor due to fretting corrosion. In contrast, this has a negative margin of −14.1%.

FIG. 7 depicts a spherical bearing 700 that may be used with the modified ram-body 100 as described with reference to FIGS. 4 to 6.

Figure 8:
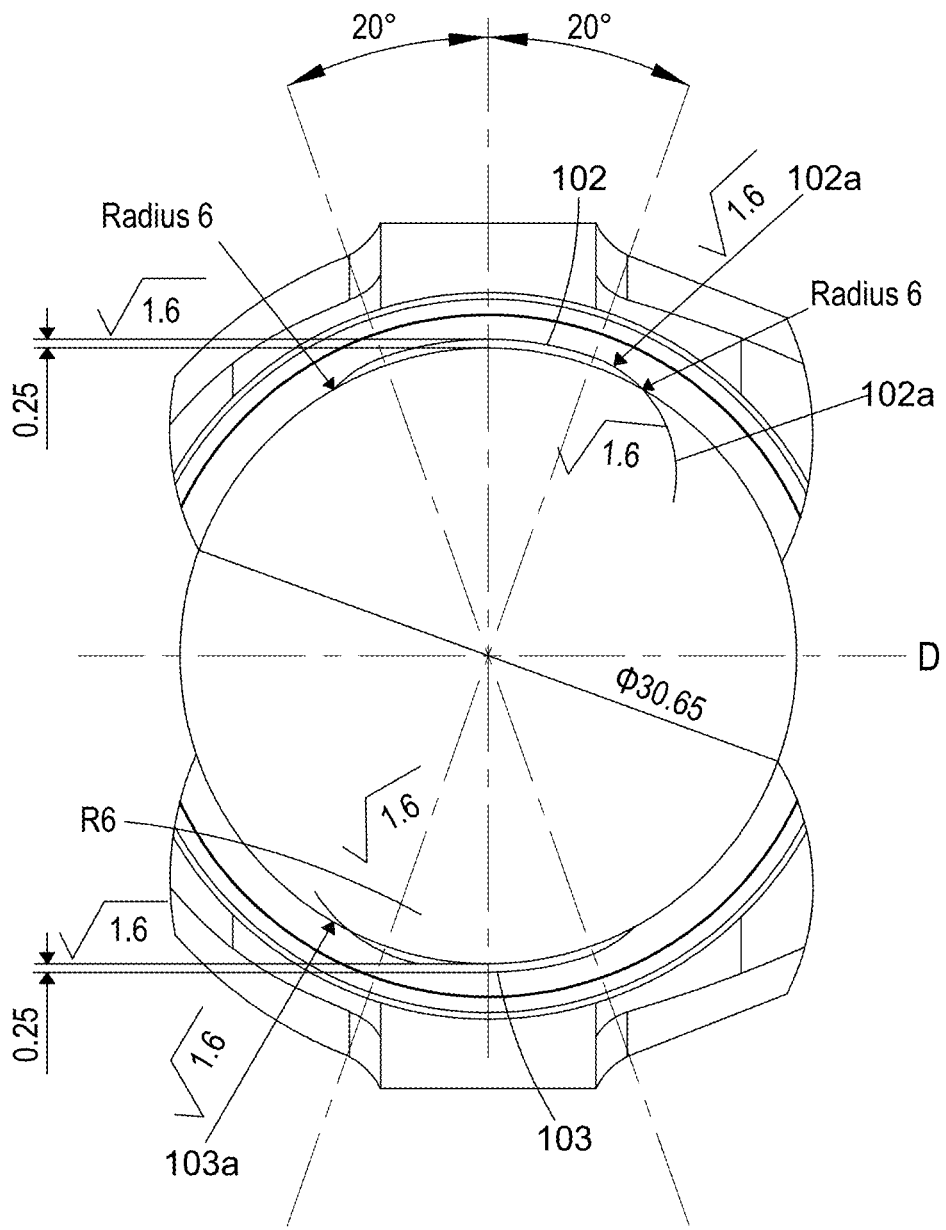
FIG. 8 depicts a more detailed view of the dimensions of the ram-body as shown in FIG. 3.

FIG. 8 shows a more detailed version of the dimensions shown in FIG. 3. In the examples described herein with reference to FIG. 4 onwards, the concave sections 102, 103 may be positioned diametrically (e.g. at 6 and 12 o'clock) from each other so that each of them cover a section of about 11 percent of the inner circumferential length of the ram-body 100.

That is, each concave section 102, 130 is defined by a concave circular arc 102a, 103a that extends into the ram-body 100 (i.e. concave) in comparison to the arc of the ram-body internal circumferential surface 101. Intersect points (which define the edges, or start and finish points, of the concave sections 102, 103 in a circumferential direction) between the ram-body 100 and the concave circular arc 102a, 103a of the concave section 102, 103 are defined by an arc angle of between 40° to 50° from the center of the ram-body 100, as shown in FIG. 8. In this figure, the angle is 40° however, other angles in this range of 40° to 50° may be used. That is, the circumferential length of each concave section 102, 103 is determined by an arc of approximately 40° to 50° extending from the central point of the ram-body 100.

These angles have been chosen since they were found to be the lowest angles possible wherein it is still possible to guarantee a good hold of the spherical bearing 700 by the ram-body 100. The angle of the arc being 40° is still large enough, however, to cover all of the section 120 or area of the ram-body 100 that is under the maximum stress.

As can be seen in FIG. 4, the radius intersecting the concave sections 102, 103 and the ram-body 100 may be between 5 mm and 7 mm, and in this case, is 6 mm. The center point of this concave circular arc 102a, 103a is positioned between the center point of the ram-body 100 and the inner circumferential surface 101 of the ram-body 100. Since the radius of curvature of the ram-body 100 in this case is approximately 15 mm (see FIGS. 4 and 8 which describe it as being 15.325 mm), this results in a concave section 102, 130 having a concave depth of around 0.25 mm.

In summary, the ratio of the length of the intersection radius to the length of the internal radius of the ram-body 100 is approximately 1:2.55. Ratios in the range of 1:2 to 1:2.6 may also be envisaged.

The radius of curvature value of the intersection radius between the concave sections 102, 103 and the ram-body 100 may be calculated by finding a compromise between having the largest dimension possible without impacting too much the holding of the bearing. The above ratio has therefore been chosen in this example as being the largest possible whilst still avoiding stress concentration factor due to the geometry shape variation.

As mentioned above, in some examples, these concave sections 102, 103 are positioned so as to be diametrically opposite each other. They may be diametrically placed at 6 and 12 o'clock and in some examples may also share the exact same shape. Since fretting corrosion normally appears where the two parts are most constrained and where there is a relative displacement between each other, by providing these concave sections so as to be diametrically opposite each other (i.e. at 180° about the inner circumference), the amount of fretting corrosion is reduced as they are positioned in the load path where the constraints are the highest in the assembly. As mentioned above, the highest point of stress is shown as 12 and 12a in FIG. 1 and so the concave sections would be positioned in those locations. For actuation applications, the maximum stress points will always be in the load path as shown in FIGS. 2 and 5. Due to this, when the lunular section(s) 102, 103 are positioned at a point on the inner circumference 101 of the ram-body 100 where the highest points of stress usually occur, the knockdown factor for fretting corrosion is avoided and the overall design is also reduced in weight. A knockdown factor is a term known in the art and provides an empirical value defined by fatigue lab testing that defines the impact of an external element on the material fatigue sustainability.

In some examples, these concave, lunular sections may be created by milling the inner circumferential surface 101 of the bearing 100. Other methods may, of course, alternatively be used to create this lunular section.

The lunular section(s) 102, 103 of the ram-body 100 faces the outer surface of the spherical bearing 700 when in use, and due to the concave surface of the lunular section 102, this section of the ram-body 100 and the outer surface of the spherical bearing are not in contact at this point.

The examples described herein provide benefits over known components. For example, the large knockdown factor in the ram-body material does not need to be anticipated and so the design is a lot lighter. In addition to this, there is no longer any need for an interface product, such as silver, to be provided between the inner surface of the bearing and the outer surface of the ram-body. This therefore reduces the overall cost of the components.

The invention claimed is:

1. A ram-body for use with a spherical bearing, said ram-body having an inner circumferential surface; wherein said ram-body comprises at least a first concave section provided in said inner circumferential surface, wherein the first concave section forms a recess defined by a radius of curvature of the first concave section and a theoretical arc defined by a radius of curvature of the inner circumferential surface of the ram body, wherein said first concave section is lunular shaped such that the radius of curvature of the first concave section is smaller than a radius of curvature of the inner circumferential surface of the ram body;
wherein first and second intersect points between the ram-body and the concave section are defined by an arc angle of 40° from a center of the ram-body, and wherein said first and second intersect points define first and second edges of the concave section.

2. The ram-body of claim 1, wherein a center point of the radius of curvature of the first concave section is positioned between a center point of the ram-body and the inner circumferential surface of the ram-body.

3. The ram-body of claim 1, wherein a ratio of the length of the radius of curvature of the first concave section to the length of the radius of curvature of the inner circumferential surface of the ram body is in the range of 1:2 to 1:2.6.

4. The ram-body of claim 3, wherein said ratio is 1:2.55.

5. The ram-body of claim 1, further comprising a second concave section, identical to said first concave section.

6. The ram-body of claim 5, wherein said first and second concave sections are positioned so as to be diametrically opposite each other.

7. A ram-body and spherical bearing assembly, comprising:
the ram-body of claim 1; and
and a spherical bearing having an outer surface;
wherein said ram-body surrounds said spherical bearing so that said inner circumferential surface of said ram-body is in contact with said outer surface of said spherical bearing; and
wherein said inner circumferential surface of said ram-body at said first section is not in contact with said outer surface of said spherical bearing.

8. An assembly comprising:
a ram-body having:
an inner circumferential surface; and
a first concave section provided in said inner circumferential surface of said ram-body, wherein the first concave section forms a recess defined by a radius of curvature of the first concave section and a theoretical arc defined by a radius of curvature of the inner circumferential surface of the ram body, wherein said first concave section is lunular shaped such that a radius of curvature of the first concave section is smaller than a radius of curvature of the inner circumferential surface of the ram body; and
a second concave section, identical to said first concave section; and
a spherical bearing having an outer surface;
wherein said ram-body is provided around said spherical bearing so that said inner circumferential surface of said ram-body is in contact with said outer surface of said spherical bearing; and
wherein said inner circumferential surface of said ram-body at said second concave section is not in contact with said outer surface of said spherical bearing,
wherein first and second intersect points between the ram-body and the concave section are defined by an arc angle of 40° from a center of the ram-body, and wherein said first and second intersect points define first and second edges of the concave section.

9. A method of manufacturing a ram-body for use with a spherical bearing,
said ram-body having an inner circumferential surface; said method comprising:
forming at least a first concave section in said inner circumferential surface, wherein the first concave section forms a recess defined by a radius of curvature of the first concave section and a theoretical arc defined by a radius of curvature of the inner circumferential surface of the ram body, wherein said first concave section is lunular shaped such that a radius of curvature of the first concave section is smaller than a radius of curvature of the inner circumferential surface of the ram body;
wherein first and second intersect points between the ram-body and the concave section are defined by an arc angle of 40° from a center of the ram-body, and wherein said first and second intersect points define first and second edges of the concave section.

10. The method of claim 9, further comprising:
forming a second concave section on said inner circumferential surface, said second concave section being positioned diametrically opposite to said first concave section.

11. The method of claim 10, wherein said ram-body is formed from stainless steel and said first and second concave sections are formed by milling.

* * * * *